United States Patent [19]
Kinoshita et al.

[11] Patent Number: 6,017,290
[45] Date of Patent: Jan. 25, 2000

[54] CONTROLLING LOCKUP CLUTCH AND SHIFTS AS A FUNCTION OF CRUISE MODE AND NORMAL MODE

[75] Inventors: Masakazu Kinoshita, Anjo; Katsutoshi Usuki, Toyoake; Shoji Kan; Eiji Moriyama, both of Okazaki, all of Japan

[73] Assignee: Mitsubishi Jidosha Kogyo Kabushiki Kaisha, Tokyo, Japan

[21] Appl. No.: 09/072,744

[22] Filed: May 6, 1998

[30] Foreign Application Priority Data

May 6, 1997 [JP] Japan .................................. 9-115748

[51] Int. Cl.$^7$ .................................................. F16H 45/02
[52] U.S. Cl. ........................... 477/108; 477/107; 477/174
[58] Field of Search ...................................... 477/107, 108, 477/109, 110, 174; 701/57–61

[56] References Cited

U.S. PATENT DOCUMENTS

| | | | |
|---|---|---|---|
| 5,074,371 | 12/1991 | Shibayama | 477/108 X |
| 5,119,899 | 6/1992 | Johnson et al. | 477/108 X |
| 5,129,475 | 7/1992 | Kawano et al. | 477/108 X |
| 5,382,206 | 1/1995 | Oda et al. | 477/108 |
| 5,507,705 | 4/1996 | Hara | 477/108 |
| 5,623,408 | 4/1997 | Motamedi et al. | 477/108 X |
| 5,665,026 | 9/1997 | Linden | 477/108 |
| 5,758,306 | 5/1998 | Nakamura | 477/107 X |

*Primary Examiner*—Khoi Q. Ta

[57] ABSTRACT

A control device of an automatic transmission of a motor vehicle includes lock-up control means for controlling a coupling state between input and output elements of a torque converter clutch. This control device is used with an engine, which includes an electronic throttle control device that electrically controls a throttle valve, accelerator position detecting means for detecting an accelerator pedal position, a cruise control device that controls an opening of the throttle valve to maintain a vehicle speed at a predetermined vehicle speed, for enabling constant-speed running of the vehicle, and target throttle opening setting means for calculating a pseudo accelerator pedal position, and setting a target throttle opening based on the pseudo accelerator pedal position, when the cruise control device is in operation. The lock-up control means receives information as to whether the cruise control device is in operation or not, controls the coupling state of the torque converter clutch based on the pseudo accelerator pedal position if the cruise control device is in operation, and controls the coupling state based on the accelerator pedal position detected by the accelerator position detecting means if the cruise control device is not in operation.

20 Claims, 7 Drawing Sheets

CONTROLLING LOCKUP CLUTCH AND SHIFTS AS A FUNCTION OF CRUISE MODE AND NORMAL MODE

FIELD OF THE INVENTION

The present invention relates to a control device of an automatic transmission installed in a motor vehicle equipped with a cruise control device, and in particular to such a control device of an automatic transmission, which includes a lock-up control device that controls a coupling state between input and output elements of a torque converter clutch.

BACKGROUND OF THE INVENTION

In one type of automatic transmission of an automobile that has been developed in recent years, a lock-up clutch is provided for controlling a coupling state between input and output elements of a torque converter, and this lock-up clutch is engaged as needed to directly couple the input and output elements of the torque converter, thereby avoiding an energy loss which would otherwise occur during power transmission through the torque converter.

Figure 6:
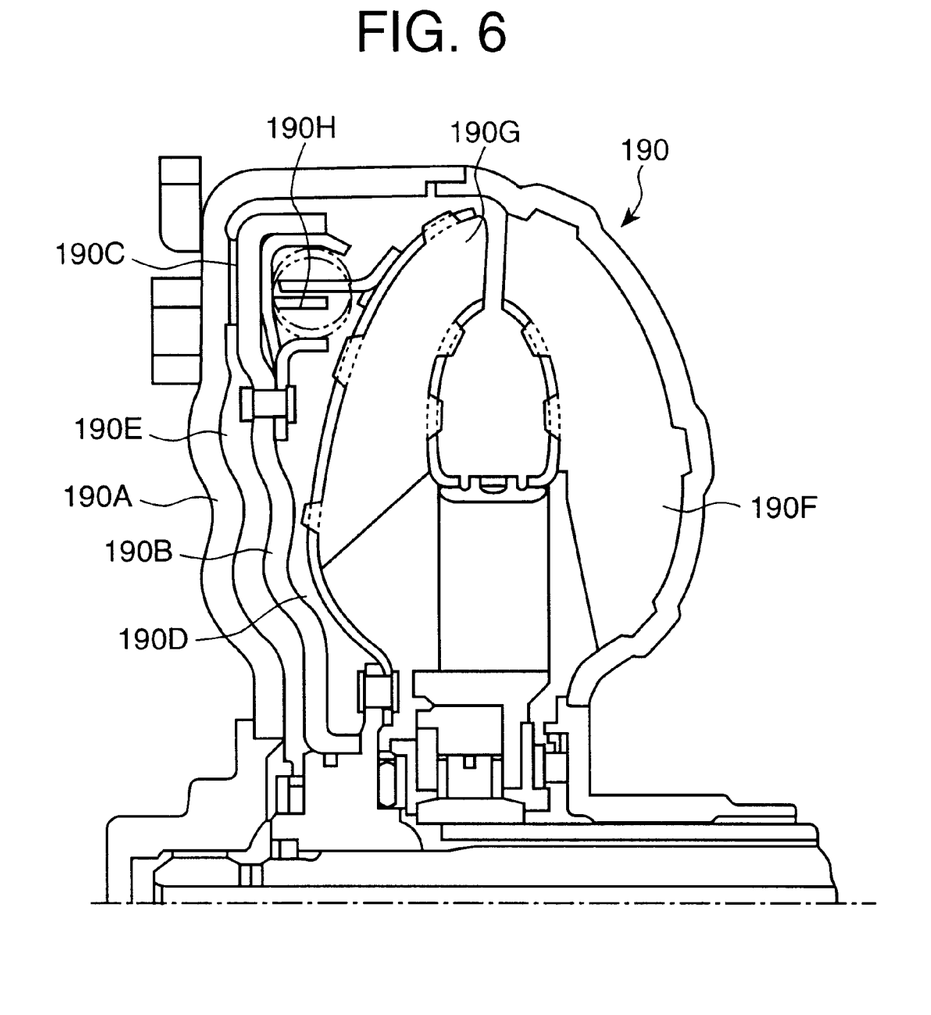
FIG. 6 is a cross-sectional view showing a conventional torque converter equipped with a lock-up clutch.

FIG. 6 is a cross-sectional view showing an example of a torque converter equipped with a lock-up mechanism. The torque converter 190 includes a hydraulic piston 190B within a housing 190A, and a lock-up clutch 190C is interposed between the inner wall of the housing 190A and the hydraulic piston (lock-up piston) 190B.

When the lock-up clutch 190C is being disengaged, an oil is supplied from a control valve (not shown) to both sides of the hydraulic piston 190B, namely, a coupling-side oil chamber 190D and a release-side oil chamber 190E, so that the pressure in the oil chamber 190D is made substantially equal to that in the oil chamber 190E. Upon receipt of a lock-up command, the oil is supplied from an oil pump (not shown) to the coupling-side oil chamber 190D, to thus increase the oil pressure in the coupling-side oil chamber 190D, whereby the hydraulic piston 190B is moved to the left as viewed in FIG. 6, to engage the lock-up clutch 190C.

In FIG. 6, reference numeral 190F denotes a pump impeller, 190G denotes a turbine runner, and 190H denotes a torsion damper for absorbing vibrations during engagement of the lock-up clutch 190C.

When the output torque from the engine is input to the automatic transmission, the lock-up clutch (torque converter clutch), constructed as described above, may be engaged to transmit output from the engine to the automatic transmission while reducing a loss of the engine output. When the output torque from the engine is not input to the automatic transmission, on the other hand, the lock-up clutch need not be engaged, namely, the input and output elements of the torque converter are not directly coupled to each other, so that the torque converter can smoothly transmit the power from the engine to the transmission while using a fluid (oil) contained therein.

In the meantime, the accelerator pedal position (amount of depression of the accelerator pedal) is used for determining whether the output torque from the engine is input to the automatic transmission. Thus, engagement of the lock-up clutch is controlled based on the accelerator pedal position.

More specifically, when the accelerator pedal is depressed (i.e., if the amount of depression of the accelerator pedal is larger than a predetermined low value), it may be determined that the torque is transmitted from the engine toward the automatic transmission. When the accelerator pedal is not depressed (i.e., if the amount of depression of the accelerator pedal is less than the predetermined low value), it may be determined that the torque is not transmitted from the engine toward the automatic transmission.

Accordingly, the torque converter may be controlled so that the lock-up clutch is engaged if the accelerator pedal is depressed, and engagement of lock-up clutch is released if the accelerator pedal is not depressed.

In such an engine, in which the throttle opening completely corresponds to the amount of depression of the accelerator pedal (accelerator pedal position), the above control for engaging the lock-up clutch may be performed based on the throttle opening.

In the case of an engine equipped with an electronic throttle control device (generally called "drive-by-wire"), which electrically controls the throttle valve, however, a target throttle opening is determined based on the accelerator pedal position, and additional information other than the accelerator pedal position, and the throttle opening is controlled based on this target throttle opening. Since the target throttle opening thus determined does not completely correspond to the actual accelerator pedal position, the control for engaging the lock-up clutch cannot be performed based on this throttle opening instead of the accelerator pedal position.

For the reasons as stated above, the engine equipped with the electronic throttle control device performs control for engaging the lock-up clutch based on the accelerator pedal position.

In recent years, motor vehicles equipped with cruise control devices for maintaining a vehicle at a constant-speed have been developed. The cruise control device controls the engine output and shift positions of the automatic transmission so that the vehicle runs at a constant speed which is equal to a set vehicle speed (target vehicle speed), without requiring depression of the accelerator pedal by a driver.

While the vehicle equipped with such a cruise control device is running under control of the cruise control device, namely, while the cruise control device is being in operation, the torque may be transmitted from the engine to the automatic transmission even if the amount of depression of the accelerator pedal is always zero (or less than a predetermined small amount), in other words, the accelerator pedal is kept at its fully released position.

If engagement of the lock-up clutch is controlled based on the accelerator pedal position while the vehicle is running under the cruise control, the lock-up clutch is always placed in the released or disengaged state, and is thus unable to be engaged even in a driving region in which clutch engagement is desired for the sake of reduction of the energy loss. Thus, the use of the lock-up clutch does not lead to energy saving during the cruise control.

Japanese laid-open Patent Publication No. 61-218442 discloses a technique for controlling the lock-up clutch based on the vehicle speed set by the cruise control device and the shift position of the transmission selected by a transmission controller. However, the control of the lock-up clutch disclosed in the above-identified publication does not take account of whether the torque is being transmitted from the engine to the automatic transmission or not, thus making it difficult to achieve a highly efficient control of the lock-up clutch.

SUMMARY OF THE INVENTION

It is, therefore, a first object of the present invention to provide a control device of an automatic transmission installed in a motor vehicle equipped with an electronic throttle control device and a cruise control device, wherein a lock-up clutch can be appropriately controlled even during an operation of the cruise control device, thus assuring an improved energy saving.

It is a second object of the invention to provide a control device of an automatic transmission installed in a motor vehicle equipped with an electronic throttle control device and a cruise control device, wherein a shift control of the transmission can be appropriately performed even during an operation of the cruise control device, thus assuring an improved energy saving.

In a control device of an automatic transmission according to one aspect of the present invention, lock-up control means is provided for controlling a coupling state between input and output elements of a torque converter for transmitting a driving force from the engine to the transmission. In a motor vehicle equipped with this control device, an electronic throttle control device electrically controls a throttle valve of the engine, and a cruise control device control causes the electronic throttle control device to control the opening of the throttle valve so that the vehicle runs at a constant speed, which is kept equal to a set vehicle speed (target vehicle speed) set by the cruise control device.

While the vehicle is running under the control of the cruise control device, target throttle opening setting means calculates a pseudo accelerator pedal position, and sets a target throttle opening based on the pseudo accelerator pedal position. The lock-up control means receives information as to whether the cruise control device is in operation or not, controls the coupling state between the input and output elements of the torque converter based on the pseudo accelerator pedal position if the cruise control device is in operation, and controls the coupling state based on the actual accelerator pedal position detected by accelerator position detecting means if the cruise control device is not in operation.

In a control device of an automatic transmission according to another aspect of the invention, shift pattern control means performs a shift control of the transmission according to a predetermined shift pattern. In a motor vehicle equipped with this control device, an electronic throttle control device electrically controls a throttle valve of the engine, and a cruise control device control causes the electronic throttle control device to control the opening of the throttle valve so that the vehicle runs at a constant speed, which is kept equal to a set vehicle speed (target vehicle speed) set by the cruise control device.

While the vehicle is running under the control of the cruise control device, target throttle opening setting means calculates a pseudo accelerator pedal position, and sets a target throttle opening based on the pseudo accelerator pedal position. The shift pattern control means receives information as to whether the cruise control device is in operation or not, performs the shift control based on the pseudo accelerator pedal position if the cruise control device is in operation, and performs the shift control based on the actual accelerator pedal position detected by the accelerator position detecting means if the cruise control device is not in operation.

DETAILED DESCRIPTION OF THE PREFERRED EMBODIMENT

The present invention will become more fully understood from the detailed description given hereinbelow and the accompanying drawings which are given by way of illustration only, and thus are not limitative of the present invention.

FIG. 1 through FIG. 5 show a control apparatus of an internal combustion engine equipped with an automatic transmission and a control device of an automatic transmission according to one embodiment of the present invention.

Figure 2:
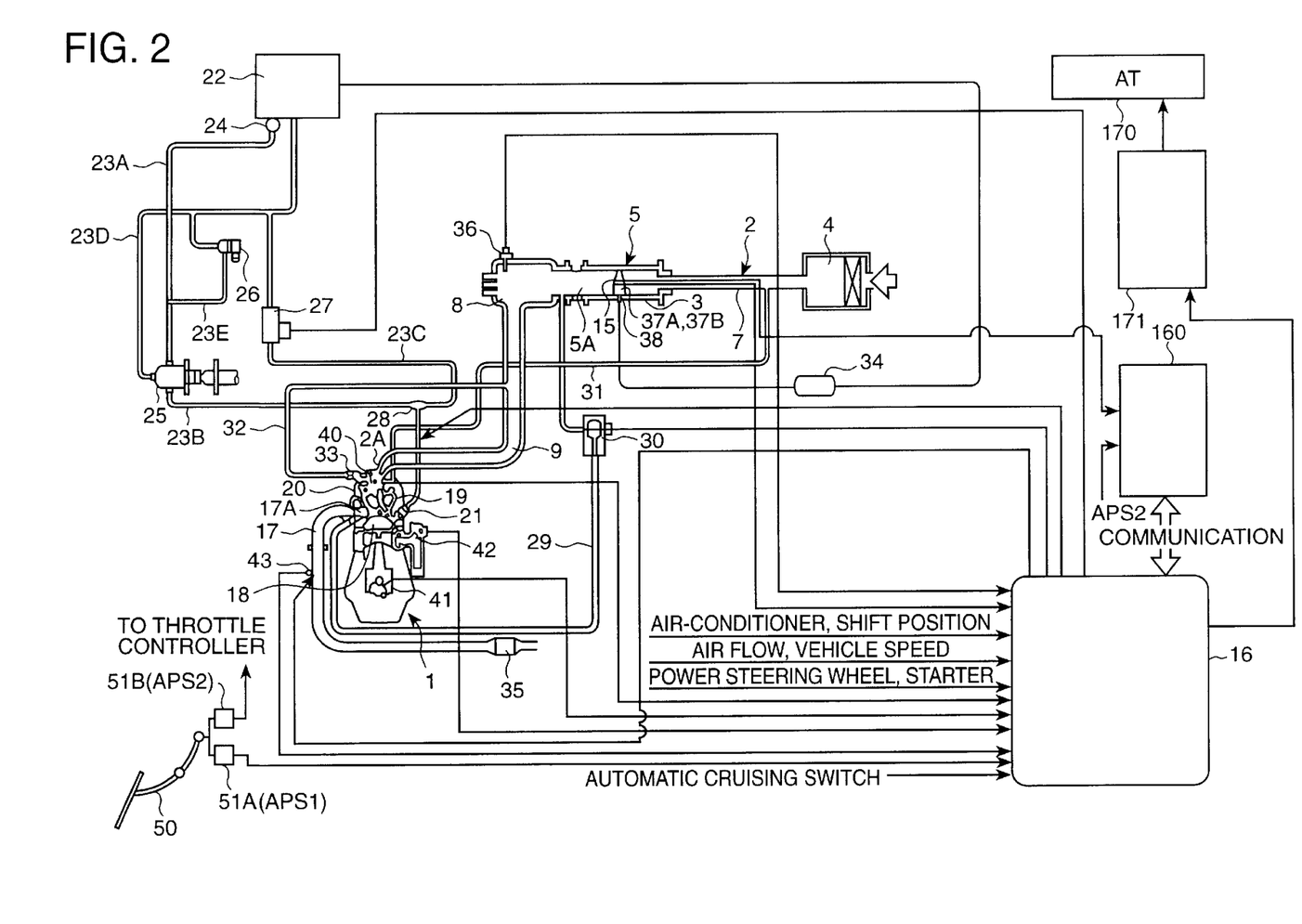
FIG. 2 is a block diagram showing the internal combustion engine equipped with the automatic transmission and the control device of the transmission according to the embodiment of FIG. 1.

The construction of the entire system of the engine (internal combustion engine) associated with the present embodiment will be first explained by referring to FIG. 2. In FIG. 2, the engine system includes an engine body 1, an intake passage 2, a throttle valve installed portion 3, and an air cleaner 4. The intake passage 2 is connected to an intake pipe 7, a throttle body 5, a surge tank 8, and an intake manifold 9 in the order of description as viewed from the upstream side of the passage 2.

The throttle body 5 is provided with an electronic controlled throttle valve 15, which is electrically controlled, and the opening of this electronic controlled throttle valve 15 is controlled by means of a throttle control computer (that is also called "throttle controller" or "ETV") 160, which will be described later. The target opening of the throttle valve 15 (target throttle opening) is set or determined by an engine control computer (engine ECU) 16, which will be described later, depending upon an amount of depression of an accelerator pedal 50 (accelerator pedal position) detected by an accelerator position sensor (APSI) 51A, and operating conditions of the engine.

Figure 1:
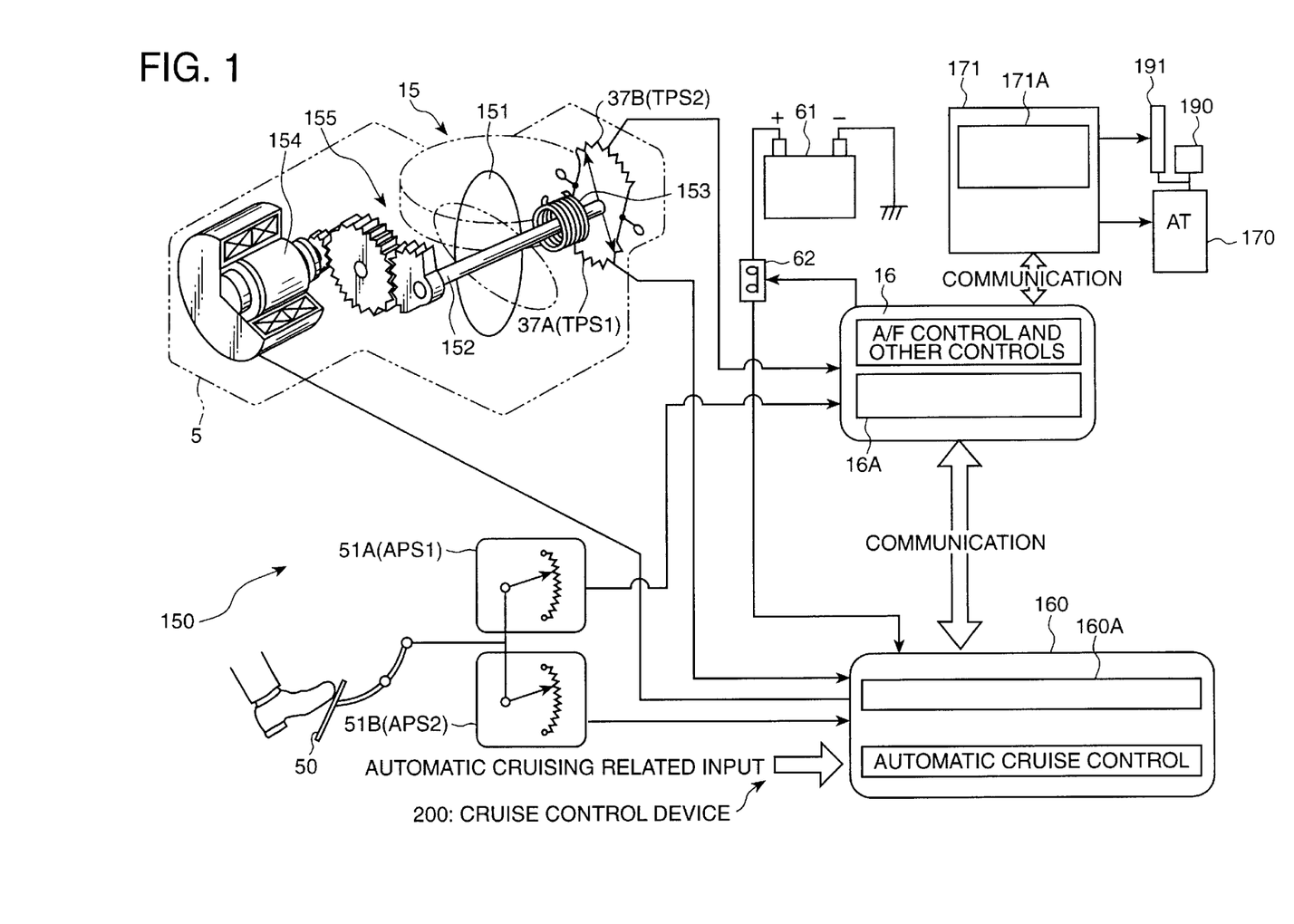
FIG. 1 is a schematic view showing a principal part of an internal combustion engine equipped with an automatic transmission and a control device of the automatic transmission according to one embodiment of the present invention.

The electronic controlled throttle valve 15, engine ECU 16, throttle controller 160 and others constitute an electronic throttle control device (also called drive-by-wire (DBW)) 150 as shown in FIG. 1.

In FIG. 2, reference numeral 17 denotes an exhaust passage, and 18 denotes a combustion chamber. Intake valve 19 and exhaust valve 20 are respectively provided at openings (i.e., intake port 2A and exhaust port 17A) of the intake passage 2 and exhaust passage 17 which are open to the combustion chamber 18.

The engine system of FIG. 2 further includes a fuel tank 22, fuel supply paths 23A–23E, a low-pressure fuel pump 24, a high-pressure fuel pump 25, a low-pressure regulator 26, a high-pressure regulator 27, and a delivery pipe 28. The fuel in the fuel tank 22 is driven or pumped by the low-pressure fuel tank 24, and further pressurized by the high-pressure fuel tank 25, so that the fuel, to which a certain high pressure is applied, is supplied to a fuel injector 21, through the fuel supply paths 23A, 23B and the delivery pipe 28. During the supply of the fuel, the pressure of the fuel delivered from the low-pressure fuel pump 24 is regulated by the low-pressure regulator 26, and the pressure of the fuel delivered from the high-pressure fuel pump 25 is regulated by the high-pressure regulator 27.

The engine system of FIG. 2 further includes an exhaust gas recirculating passage (EGR passage) 29, through which a part of exhaust gases is recirculated into the intake passage 2, an EGR valve 30 for controlling the amount of exhaust gases recirculated through the EGR passage 29, a passage 32 through which blow-by gas is circulated, a valve 33 for positively ventilating a crankcase, a canister 34, and a catalyst (three-way catalyst in this embodiment) 35 used for an exhaust emission control.

As shown in FIG. 2, the engine ECU 16 is adapted to control driving of the fuel injector 21, and driving of an ignition coil for actuating a spark plug (not shown), and also to control the opening angle of the EGR valve, pressure applied to the fuel by the high-pressure regulator 27, and so on. In addition, the engine ECU 16 controls an air bypass valve device 12 according to operating conditions and failure states of the engine. The throttle controller 160 controls opening and closing of the electronic controlled throttle valve 15, according to an acceleration command generated by the driver, and operating conditions and failure states of the engine.

To perform the above functions, the engine ECU 16 receives signals representing results of detection, from the first accelerator position sensor (APS1) 51A, an air flow sensor (not shown), an intake temperature sensor 36, a throttle position sensor (TPS) 37B for detecting the throttle opening, an idle switch 38, an air conditioner switch (not shown), a shift position sensor (not shown), a vehicle speed sensor (not shown), a power steering switch (not shown) for detecting an operating state of a power steering system, a starter switch (not shown), a first cylinder detecting sensor 40, a crank angle sensor 41, a water temperature sensor 42 for detecting the temperature of cooling water of the engine, an $O_2$ sensor 43 for detecting the oxygen concentration in exhaust gases, and so on. Since the rotating speed of the engine, or engine speed, is calculated based on signals from the crank angle sensor 41, the crank angle sensor 41 may be also called "engine speed sensor" for the sake of convenience.

The throttle controller 160 receives signals representing results of detection, from the second accelerator position sensor (APS) 51B, a throttle position sensor (TPS) 37A, and others, as shown in FIG. 2.

The engine ECU 16 and the throttle controller 160 are adapted to transmit and receive information to and from each other, through a suitable communication system.

The engine system, constructed as described above, is equipped with an automatic transmission (AT) 170, and an automatic transmission controller (AT controller) 171 for controlling the automatic transmission 170. The engine ECU 16 and the AT controller 171 transmit and receive information to and from each other, through a suitable communication system.

The engine system is also provided with a cruise control device 200 for enabling constant-speed running of the vehicle under automatic vehicle speed control, as shown in FIG. 1. The throttle controller 160 performs control of the throttle opening and others, based on input information associated with the cruise control. More specifically, when a cruise control switch (not shown) is turned ON, the engine is controlled such that the vehicle runs at a speed (target speed), which is equal to the speed at the time when the switch was turned on, and shift control of the automatic transmission 170 is also performed at the same time. Upon receipt of a command to change the target vehicle speed, the cruise control device 200 controls the engine and transmission such that the vehicle runs at a constant speed that is equal to the newly set target vehicle speed. When the cruise control device 200 receives a command to release or cancel the cruise control, by detecting depression of a brake pedal or the accelerator pedal, for example, the constant-speed running is canceled or terminated.

Referring to FIG. 1, the constructions of the electronic throttle control device (DBW) 150 according to the present invention will be described in detail.

As shown in FIGS. 1 and 2, the electronic control throttle valve 15 that constitutes the DBW 150 includes a butterfly valve 151 disposed in the intake passage 5A of the throttle body 5, a return spring 153 fitted on a shaft 152 that supports the butterfly valve 151, for applying a bias force to the butterfly valve 150 toward its closed position, an electric motor (throttle actuator) 154 for rotating/driving the shaft 152, and a gear mechanism 155 interposed between the actuator 154 and the shaft 152.

The shaft 152 is provided with the first throttle position sensor (TPS1) 37A and the second throttle position sensor (TPS2) 37B for detecting the opening of the butterfly valve 151 (throttle valve opening). Thus, the electronic throttle control device 150 is provided with two throttle position sensors (TPS1, TPS2) 37A, 37B, as a fail safe, in case either of the throttle position sensors 37A, 37B fails.

The drive-by-wire system (DBW) 150 principally consists of the electronic controlled throttle valve 15 as described above, the engine ECU 16 for setting the target opening of the electronic controlled throttle valve 15, and the throttle controller 160 that controls the operation of the actuator 154 based on the target opening set by the engine ECU 16, thereby to adjust the throttle opening.

As shown in FIG. 1, the engine ECU 16 includes a target opening setting portion (target throttle opening setting means) 16A, and the throttle controller 160 includes a throttle opening feedback control portion 160A.

Figure 3:
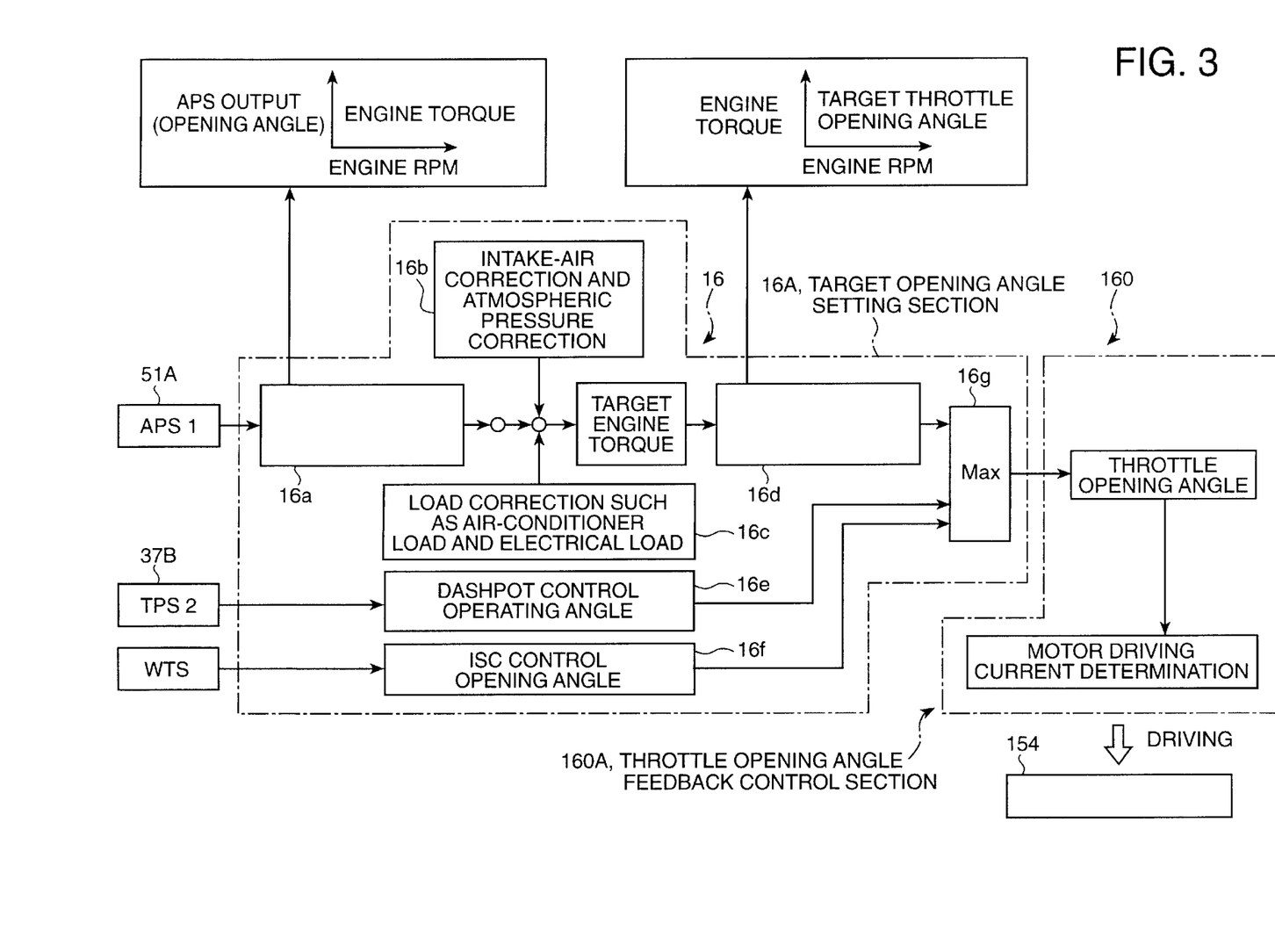
FIG. 3 is a block diagram showing an intake system of the engine in connection with the embodiment of FIG. 1.

FIG. 3 is a control block diagram for explaining throttle opening control. As shown in FIG. 3, the target opening setting portion 16A of the engine ECU 16 includes a function block 16a for setting a target engine torque, based on detected information from the first accelerator position sensor (APSI) 51A and the engine speed obtained from the crank angle sensor 41 as shown in FIG. 2, and a function block 16b for correcting the target engine torque set by the block 16a, in view of the intake air temperature and atmospheric pressure. The target opening setting portion 16A further includes a function block 16c for correcting the target engine torque set by the block 16a, in view of the operating state of the air conditioner, electric load, and the like, and a function block 16d for setting the target throttle opening based on the target engine torque thus corrected, and the engine speed.

Next, the control device of the automatic transmission of the present embodiment will be now explained. As shown in FIG. 1, this device includes the automatic transmission (AT)

170, and the automatic transmission controller (AT controlled) 171 for controlling the automatic transmission 170. The automatic transmission 170 is connected to the engine (not illustrated), with a torque converter 190 interposed therebetween.

A lock-up clutch (torque converter clutch) 191 is provided between input and output elements of the torque converter 190, and the AT controller 171 is provided with a function block (lock-up control means) 171A for controlling engagement of this lock-up clutch 191 to control coupling between the input and output elements of the torque converter 190. This torque converter 190 has a known structure, and may be constructed as described above as shown in FIG. 6, for example. Hence, the structure of the torque converter 190 will not be further described herein.

The AT controller 170 has a shift control mode in which the optimum gear position (speed ratio) of the transmission is selected, and a lock-up mode in which the input and output elements of the torque converter 190 may be directly coupled to each other through the lock-up control means 171A, or direct coupling may be released or canceled so that the power from the engine is transmitted to the transmission through the torque converter 190.

Figure 4:
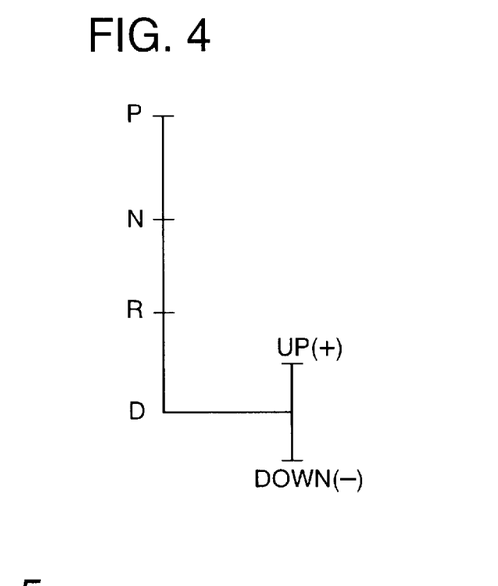
FIG. 4 is a view showing a shift pattern of a shift lever of the automatic transmission according to the embodiment of FIG. 1.

The automatic transmission of the present embodiment has first to fifth forward-speed positions, and its shift lever (not shown) is provided with a sporty-drive select switch. The shift lever has a shift pattern as shown in FIG. 4, for example, and the transmission can be selectively placed in one of an automatic shift mode and a sporty-drive mode (manual shift mode). The automatic shift mode is established when the shift lever is set to the position of D-range designated by D in FIG. 4, and the sporty-drive mode is established when the shift lever is moved to the position of UP- or DOWN-range designated by UP or DOWN in FIG. 4, respectively. Thus, the sporty-drive select switch (not shown) provided in this transmission system is turned on or off in response to a change in the position of the shift lever.

Figure 7:
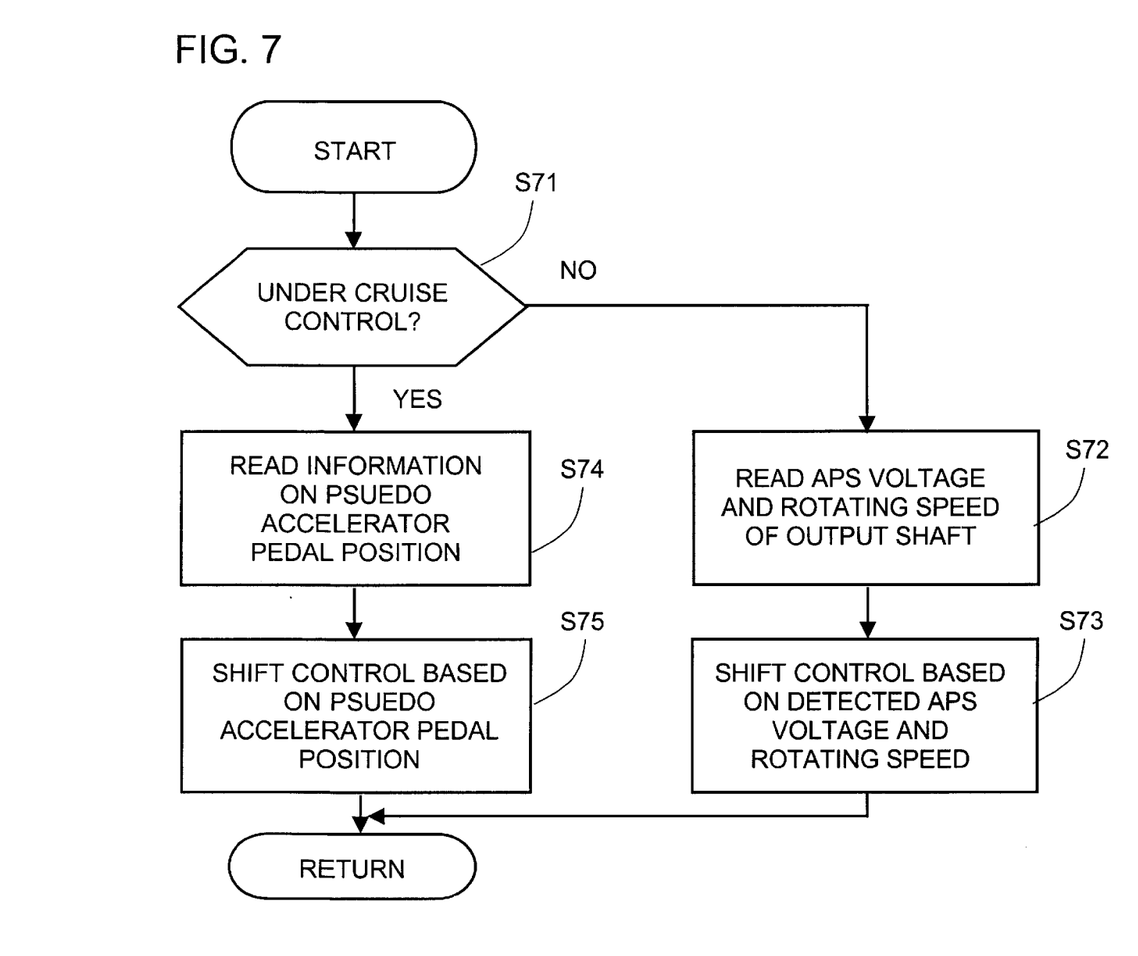
FIG. 7 is a flowchart showing the operation of the automatic transmission according to the embodiment of FIG. 1.

When the automatic shift mode is selected, the speed position or speed ratio of the transmission is automatically established. In shift pattern control performed in this automatic shift mode, one of a plurality of speed positions is selected referring to a map (not shown), or the like, based on the vehicle speed or engine speed, and engine load (accelerator pedal position in this embodiment). This speed position control is performed in the following manner and as shown in FIG. 7.

A. When it is determined (S71) that the vehicle is not under cruise control, the transmission is automatically placed in one of first-speed to fifth-speed positions, which is selected based on an APS voltage (indicative of the actual accelerator pedal position), and the rotating speed of the output shaft of the transmission (S72, 73)

B. When it is determined (S71) that the vehicle is under the cruise control, the transmission is automatically placed in one of a certain number of speed positions (first- to fifth-speed positions if none of them is inhibited), one of which is selected based on information (pseudo accelerator pedal position) corresponding to the APS voltage, and the rotating speed of the output shaft of the transmission (574, 75).

On the other hand, the lock-up control is performed in the following manner.

A. When the vehicle is not under the cruise control, the torque converter (lock-up clutch) is placed in one of a direct-coupling mode and a non-direct-coupling mode, which is selected based on the APS voltage and the rotating speed of the output shaft of the transmission. When the direct-coupling mode is selected, the input and output elements of the torque converter (lock-up clutch) are directly coupled to each other, and when the non-direct-coupling mode is selected, these input and output elements are not directly coupled to each other.

B. When the vehicle is under the cruise control, the torque converter (Cock-up clutch) is placed in one of the direct-coupling mode and non-direct-coupling mode as described above, which is selected based on information (pseudo accelerator pedal position) corresponding to the APS voltage, and the rotating speed of the output shaft of the transmission.

In the direct-coupling mode, information on the rotating speed of the input shaft of the automatic transmission may be used instead of information on the rotating speed of the output shaft of the transmission.

The pseudo accelerator pedal position, as indicated above, is calculated when the target throttle opening (target opening) is set by the target opening setting portion (target throttle opening setting means) 16A of the engine ECU 16, and the AT controller 171 receives this pseudo accelerator pedal position from the target opening setting portion 16A.

When the vehicle is under the cruise control, the target opening setting portion 16A computes a difference (Va−Vr) between the current vehicle speed (actual vehicle speed) Vr and the target vehicle speed Va to calculate a variation or change in the pseudo accelerator pedal position ΔAPSi based on this difference, according to the following expression (1), and a pseudo accelerator pedal position APSi (n) in the current control cycle is calculated according to the following expression (2), based on the variation ΔAPSi in the pseudo accelerator pedal position and a pseudo accelerator pedal position APSi (n−1) obtained in the previous control cycle.

$$\Delta APSi = A^*(Va-Vr) \tag{1}$$

$$APSi(n) = APSi(n-1) + \Delta APSi \tag{2}$$

The target opening setting portion 16 sets various control amounts of the engine, based on the pseudo accelerator pedal position APSi (n) calculated in this manner.

The control device of the present embodiment employs the pseudo accelerator pedal position instead of the actual accelerator pedal position when the vehicle is under the cruise control. This is because the torque is transmitted from the engine to the automatic transmission during the cruise control even if the accelerator pedal is not depressed by the driver. Thus, the AT controller 171 employs the pseudo accelerator pedal position for controlling engagement of the lock-up clutch (direct coupling between input and output elements of the torque converter), though control of engagement of the lock-up clutch cannot be appropriately performed if it is based on the actual accelerator position.

Figure 5:
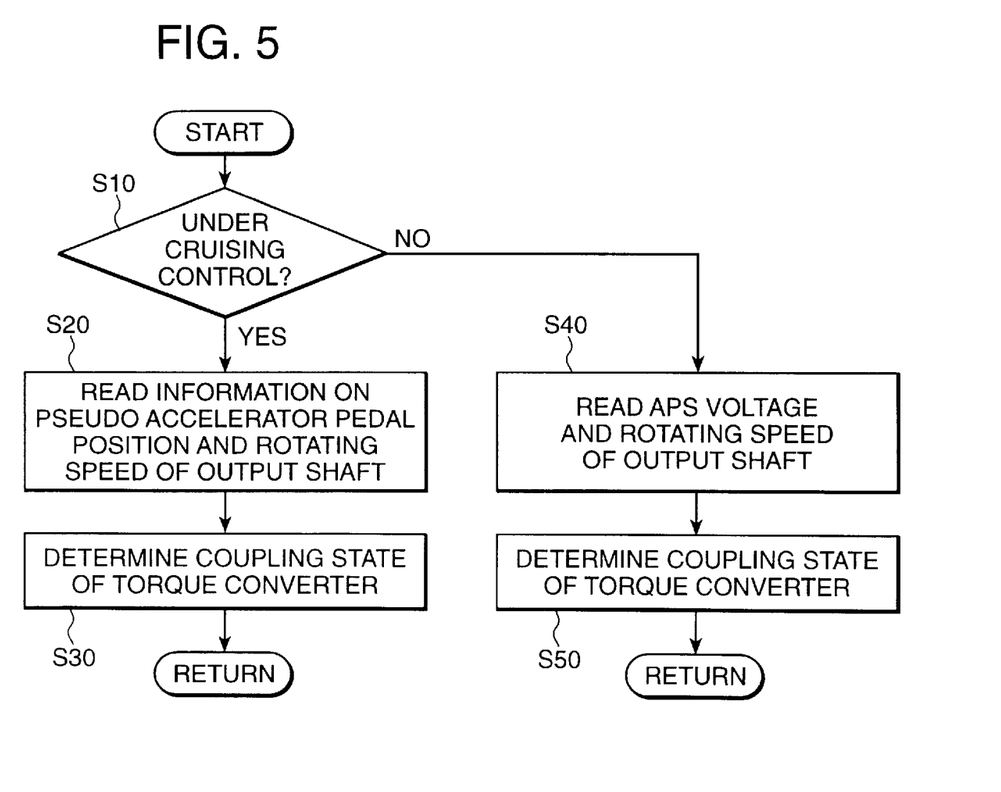
FIG. 5 is a flowchart showing the operation of the control device of the torque converter according to the embodiment of FIG. 1.

In the control device of the automatic transmission of the present embodiment, constructed as described above, the manner of reading control data for governing engagement of the lock-up clutch is changed, depending upon whether the vehicle is running under cruise control or not, as shown in the flowchart of FIG. 5.

As shown in FIG. 5, when direct-coupling control for the torque converter is started, step S10 is initially executed to determine whether the vehicle is currently under the cruise control or not. If step S10 determines that the vehicle is running under the cruise control, step S20 is then executed to read information on the pseudo accelerator pedal position and the rotating speed of the output shaft of the automatic transmission. In the next step S30, it is determined whether the lock-up clutch should be engaged or not, namely, whether the input and output elements of the torque converter should be directly coupled to each other, based on the pseudo accelerator pedal position and rotating speed of the output shaft read in step S20, and the lock-up clutch is controlled based on the result of the determination.

If step S10 determines that the vehicle is not under the cruise control, on the other hand, the control flow goes to step S40 to read information on the actual APS voltage (indicative of the actual accelerator pedal position), and information on the rotating speed of the output shaft of the automatic transmission. In the next step S50, it is determined whether the lock-up clutch should be engaged or not, namely, whether the input and output elements of the torque converter should be directly coupled to each other, based on the actual accelerator pedal position and rotating speed of the output shaft read in step S40, and the lock-up clutch is controlled based on the result of the determination.

In this manner, even while the vehicle is running under the cruise control, the direct-coupling control for the torque converter is performed as accurately as possible, based on the pseudo accelerator position transmitted from the engine ECU 16, thus assuring a reduced loss of energy during vehicle running, which leads to an improved fuel economy.

Figure 8:
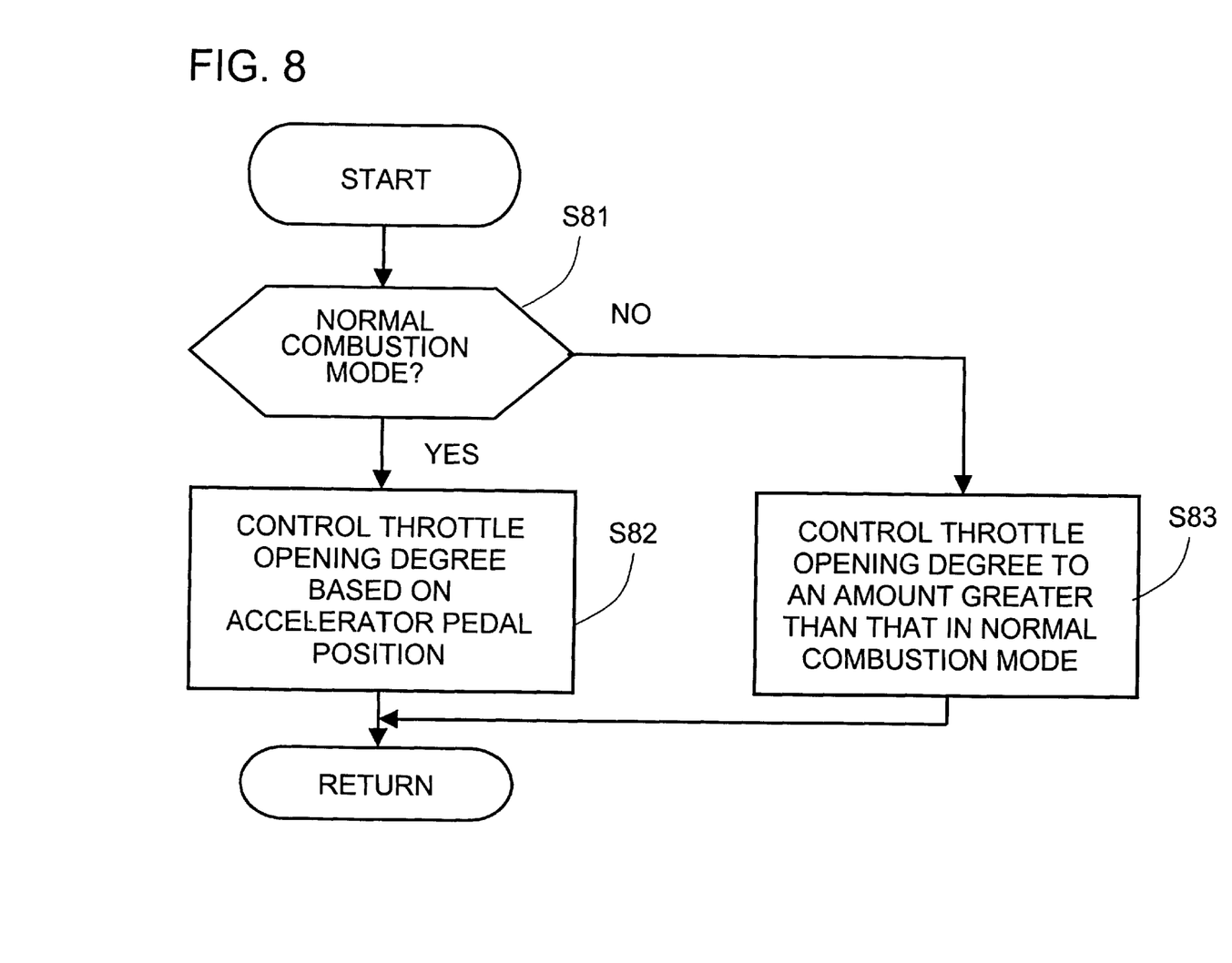
FIG. 8 is a flowchart showing the throttle opening control based on combustion modes of the internal combustion engine.

The automatic transmission of the present embodiment is preferably used in an in-cylinder fuel injection engine, which has a lean combustion mode and a normal combustion mode, wherein the fuel is directly injected into cylinders to operate the engine with a considerably high air-fuel ratio in the lean combustion mode. In such an in-cylinder fuel injection engine, the throttle valve is not mechanically connected to the accelerator pedal, and the opening degree of the throttle valve is controlled by an actuator (i.e., a motor). As shown in FIG. 8, when it is determined (S81) that the engine is operating in the normal combustion mode, the actuator controls the throttle valve opening to a degree corresponding to the accelerator pedal position as in conventional engines (S82). When, however, it is determined (S81) that the engine is operating in the lean combustion mode, the actuator controls the opening of the throttle valve to a degree greater than that in the normal combustion mode (S83) even if the accelerator pedal is maintained in the same position. When the present automatic transmission is used with this type of engine, the fuel economy can be further improved because both the direct-coupling control of the torque converter and the shift control (and shift pattern control) are performed based on the pseudo accelerator pedal position and not the actual accelerator position or an actual opening degree of the throttle valve.

It is to be understood that the automatic transmission that is controlled in the above-described manner may be also used with other types of engines which perform throttle opening control by means of an electronic throttle control device (DBW), in addition to the in-cylinder fuel injection engine, assuring an improved fuel economy.

The information on the pseudo accelerator position may also be used during the shift pattern control. In this case, the shift pattern control can be favorably performed even when the actual accelerator position cannot be appropriately obtained.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A control device of an automatic transmission of a motor vehicle, including lock-up control means for controlling a coupling state between input and output elements of a torque converter clutch that transmits a driving force from an engine to the automatic transmission, said control device comprising:

a throttle control device that controls an opening degree of a throttle valve;

accelerator position detecting means for detecting an accelerator pedal position;

a cruise control device that controls the opening degree of the throttle valve to maintain a vehicle speed at a predetermined vehicle speed; and target throttle opening setting means for calculating a pseudo accelerator pedal position, and setting a target throttle opening based on the pseudo accelerator pedal position, wherein said lock-up control means controls the coupling state between the input and output elements of the torque converter clutch based on said calculated pseudo accelerator pedal position when the cruise control device is in operation, and controls the coupling state based on the detected accelerator pedal position detected by said accelerator position detecting means when the cruise control device is not in operation.

2. A control device of an automatic transmission according to claim 1, wherein said pseudo accelerator pedal position is calculated based on a difference between an actual speed of the vehicle and the predetermined vehicle speed.

3. A control device of an automatic transmission of a motor vehicle, including shift pattern control means for performing shift control of the transmission from a first speed to a second speed according to a predetermined single shift pattern, the vehicle including an engine, comprising:

a throttle control device that controls an opening degree of a throttle valve;

accelerator position detecting means for detecting an accelerator pedal position;

a cruise control device that controls the opening degree of the throttle valve to maintain a vehicle speed at a predetermined vehicle speed; and target throttle opening setting means for calculating a pseudo accelerator pedal position, and setting a target throttle opening based on the pseudo accelerator pedal position, wherein said shift pattern control means performs the shift control based on said calculated pseudo accelerator pedal position in accordance with the predetermined single shift pattern when the cruise control device is in operation, and performs the shift control based on the detected accelerator pedal position detected by said accelerator position detecting means in accordance with the predetermined single shift pattern when the cruise control device is not in operation.

4. A control device of an automatic transmission according to claim 3, wherein said pseudo accelerator pedal position is calculated based on a difference between an actual vehicle speed of the vehicle and the predetermined vehicle speed.

5. A control device of an automatic transmission according to claim 3, wherein said engine has a normal combustion mode in which the engine operates with a first air-fuel ratio, and a lean combustion mode in which the engine operates with a second air-fuel ratio that is larger than said first air-fuel ratio, and wherein said throttle control device controls the opening degree of the throttle valve to be greater, when the engine is operating in the lean combustion mode, than the opening degree of the throttle valve when the engine is operating in the normal combustion mode.

6. A control device of an automatic transmission according to claim 1, wherein said throttle control device electrically controls the throttle valve.

7. A control device of an automatic transmission according to claim 2, wherein said target throttle opening setting means continuously updates said pseudo accelerator pedal position by adding the calculated difference and an old pseudo accelerator pedal position calculated in a preceding cycle.

8. A control device of an automatic transmission according to claim 1, wherein said target throttle opening setting means calculates said target throttle opening based on an engine torque and an engine speed.

9. A control device of an automatic transmission according to claim 8, wherein said engine torque is established based on the detected accelerator pedal position and the engine speed when said cruise control device is not in operation.

10. A control device of an automatic transmission according to claim 8, wherein said engine torque is corrected based on one or more parameter of a group consisting of an intake air temperature and an atmospheric pressure.

11. A control device of an automatic transmission according to claim 8, wherein said engine torque is corrected based on one or more parameter of a group consisting of an operating state of an air conditioner and an electric load.

12. A clutch control apparatus for controlling a clutch disposed in a torque converter connected to an internal combustion of a vehicle having a cruise control system, comprising:

an accelerator pedal position sensor which detects an actual operation amount of an accelerator pedal;

a pseudo accelerator pedal opening calculating means for calculating a pseudo accelerator pedal opening signal based on a target vehicle speed set by the cruise control system and an actual vehicle speed; and a lock-up clutch controller for determining engagement and disengagement of the lock-up clutch based on said detected actual operation amount of an accelerator pedal when the cruise control system is not in operation, and based on said calculated pseudo accelerator pedal opening signal when said cruise control system is in operation.

13. A clutch control apparatus according to claim 12, wherein said lock-up clutch controller determines the engagement and disengagement of the lock-up clutch based on the actual vehicle speed.

14. A clutch control apparatus according to claim 12, wherein said pseudo accelerator pedal opening calculating means calculates said pseudo accelerator pedal opening signal based on a difference between the target vehicle speed and the actual vehicle speed.

15. A clutch control apparatus according to claim 12, further comprising:

a target throttle opening setting means for setting a target throttle valve opening based on said detected actual operation amount of the accelerator pedal when the cruise control system is not in operation, and based on said calculated pseudo accelerator pedal opening signal when the cruise control system is in operation; and a throttle opening angle control means for controlling an actual opening degree of a throttle valve to coincide with said target throttle valve opening such that the actual vehicle speed is maintained at the target vehicle speed.

16. A clutch control apparatus according to claim 12, further comprising:

an automatic transmission connected to the torque converter; and an automatic transmission controller for controlling a shift position of said automatic transmission based on said detected actual operation amount of an accelerator pedal when the cruise control system is not in operation, and based on said calculated pseudo accelerator pedal opening signal when said cruise control system is in operation.

17. A method for controlling a clutch disposed in a torque converter connected to an internal combustion of a vehicle having a cruise control system, comprising:

detecting an actual operation amount of an accelerator pedal;

calculating a pseudo accelerator pedal opening signal based on a target vehicle speed set by the cruise control system and an actual vehicle speed; and determining engagement and disengagement of the lock-up clutch based on said detected actual operation amount of an accelerator pedal when the cruise control system is not in operation, and based on said calculated pseudo accelerator pedal opening signal when said cruise control system is in operation.

18. The method of claim 17, further comprising:

controlling a shift position of an automatic transmission connected to the torque converter based on said detected actual operation amount of an accelerator pedal when the cruise control system is not in operation, and based on said calculated pseudo accelerator pedal opening signal when said cruise control system is in operation.

19. A control device of an automatic transmission according to claim 1, wherein said engine has a normal combustion mode in which the engine operates with a first air-fuel ratio, and a lean combustion mode in which the engine operates with a second air-fuel ratio that is larger than said first air-fuel ratio, and wherein said throttle control device controls the opening degree of the throttle valve to be greater when the engine is operating in the lean combustion mode, than the opening degree of the throttle valve when the engine is operating in the normal combustion mode.

20. A control device of an automatic transmission according to claim 8, wherein said engine torque is established based on said calculated pseudo accelerator pedal position and the engine speed when said cruise control device is in operation.

* * * * *